Figure 9:
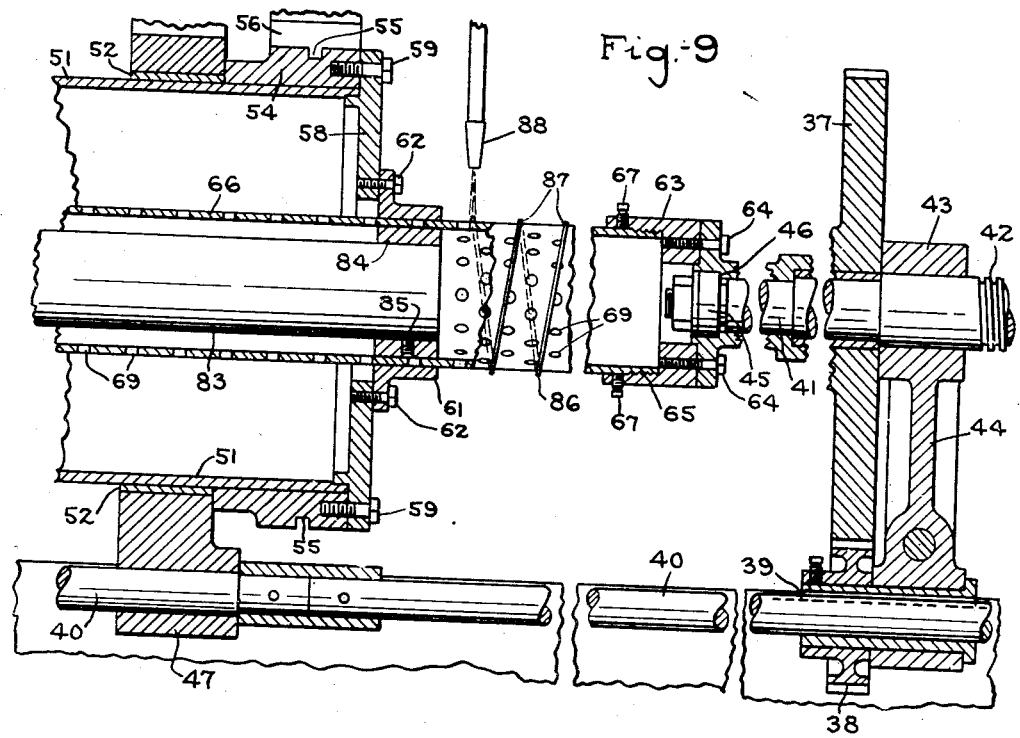

Aug. 24, 1943.   H. O. WILLIAMS ET AL   2,327,686
METHOD OF MAKING DEEP WELL SCREENS
Filed Aug. 1, 1938   8 Sheets-Sheet 1
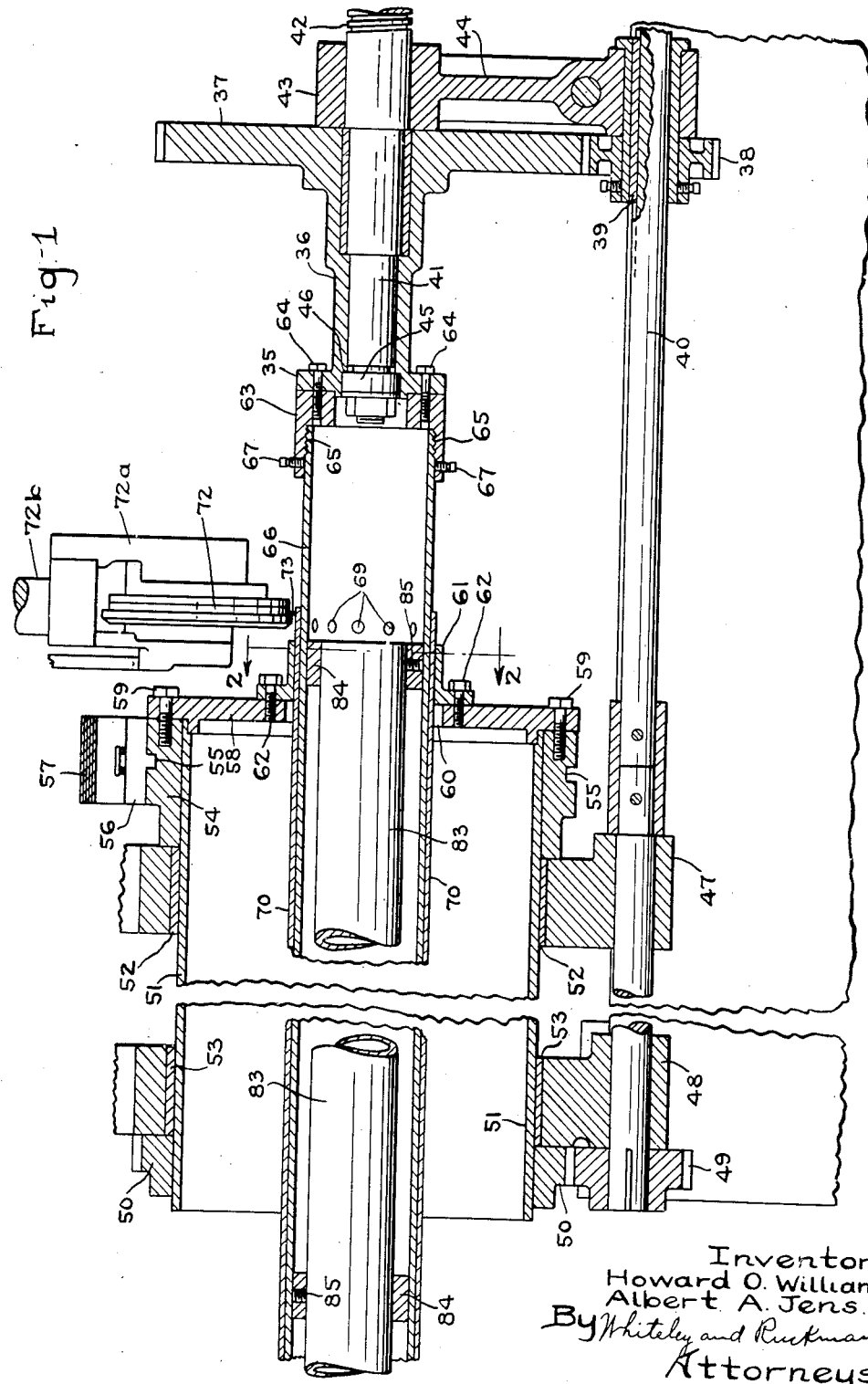
Inventors
Howard O. Williams
Albert A. Jens
By Whiteley and Ruckman
Attorneys Aug. 24, 1943.   H. O. WILLIAMS ET AL   2,327,686
METHOD OF MAKING DEEP WELL SCREENS
Filed Aug. 1, 1938   8 Sheets-Sheet 2
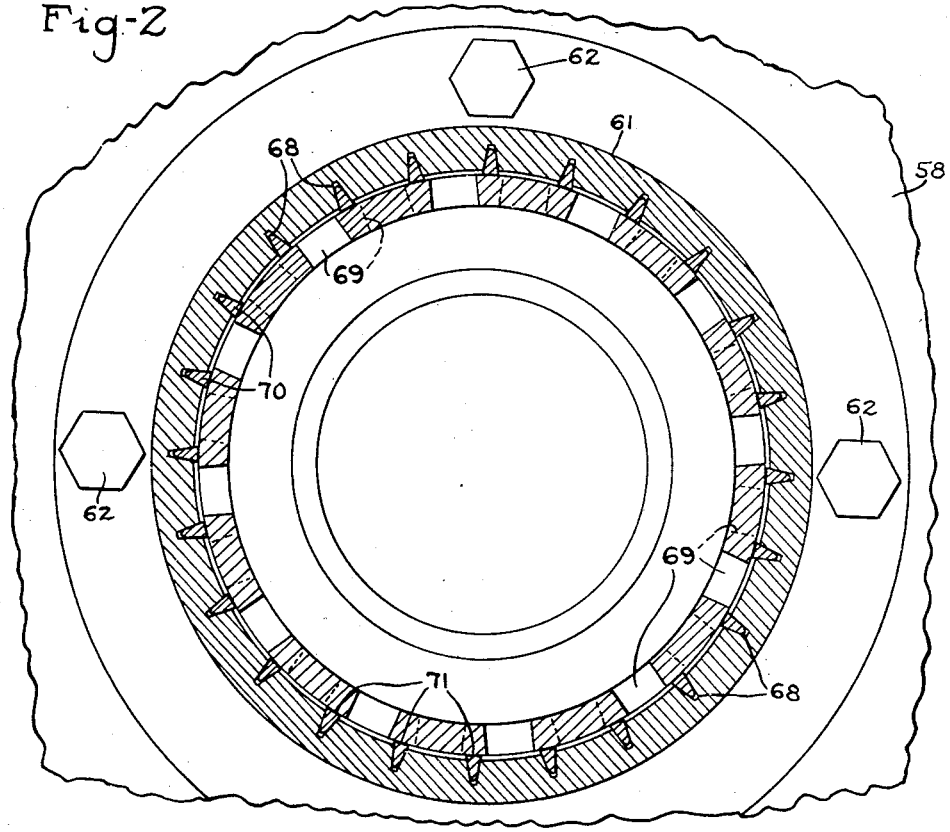
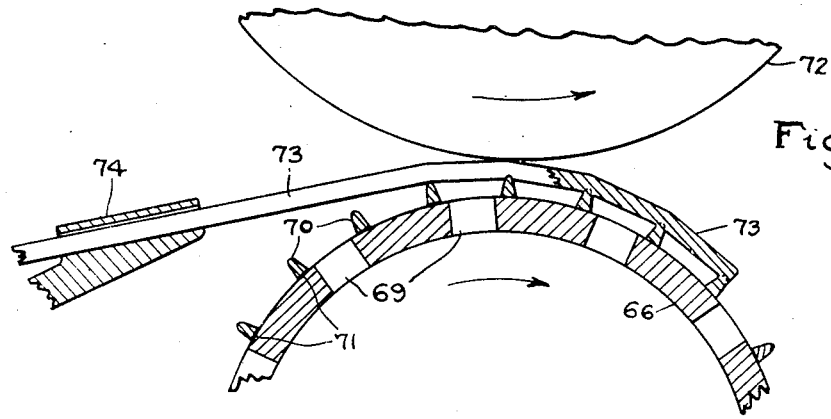
Inventors:
Howard O. Williams.
Albert A. Jens.
By Whiteley and Ruckman
Attorneys

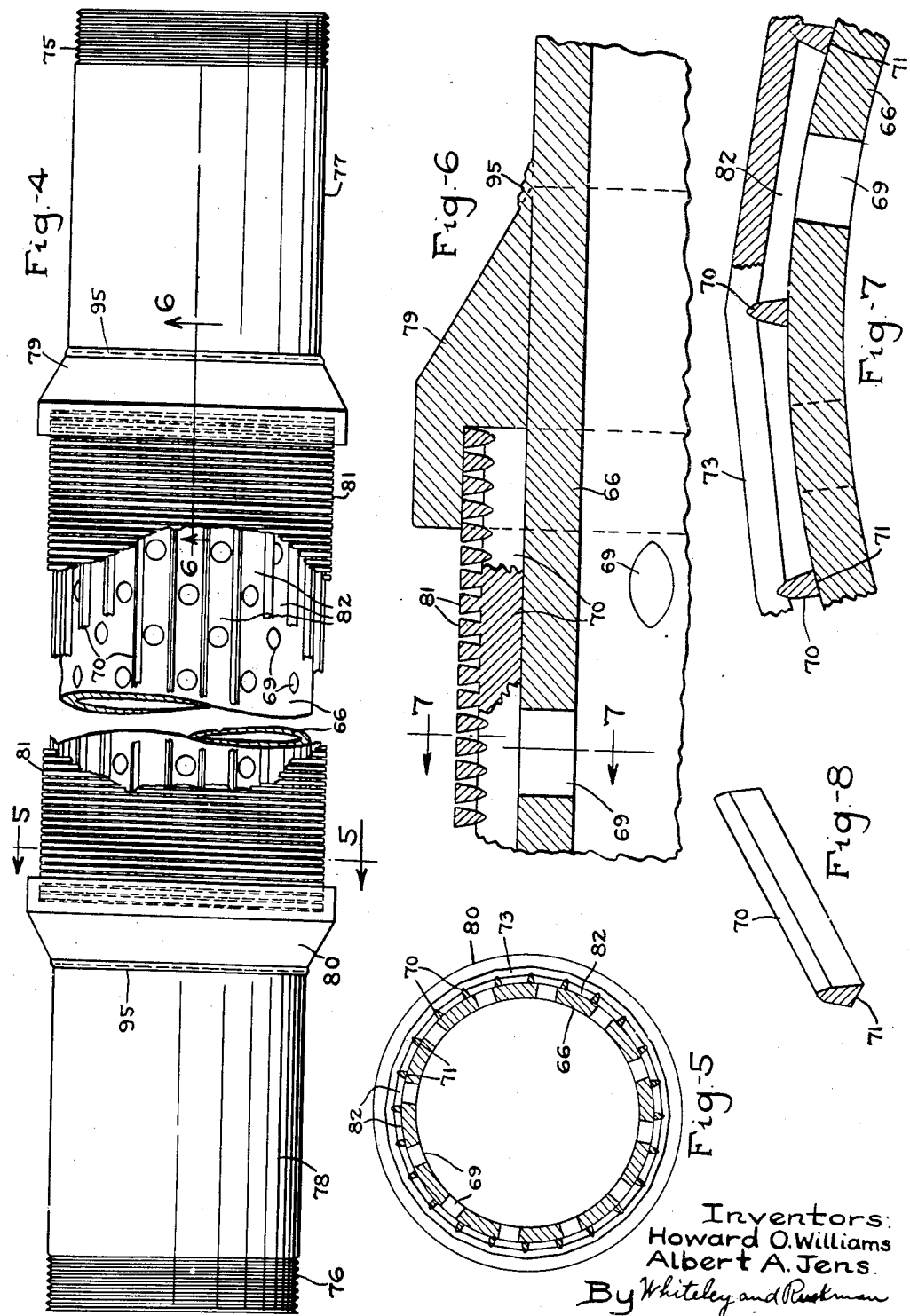

Inventors:
Howard O. Williams
Albert A. Jens
By Whiteley and Ruckman
Attorneys

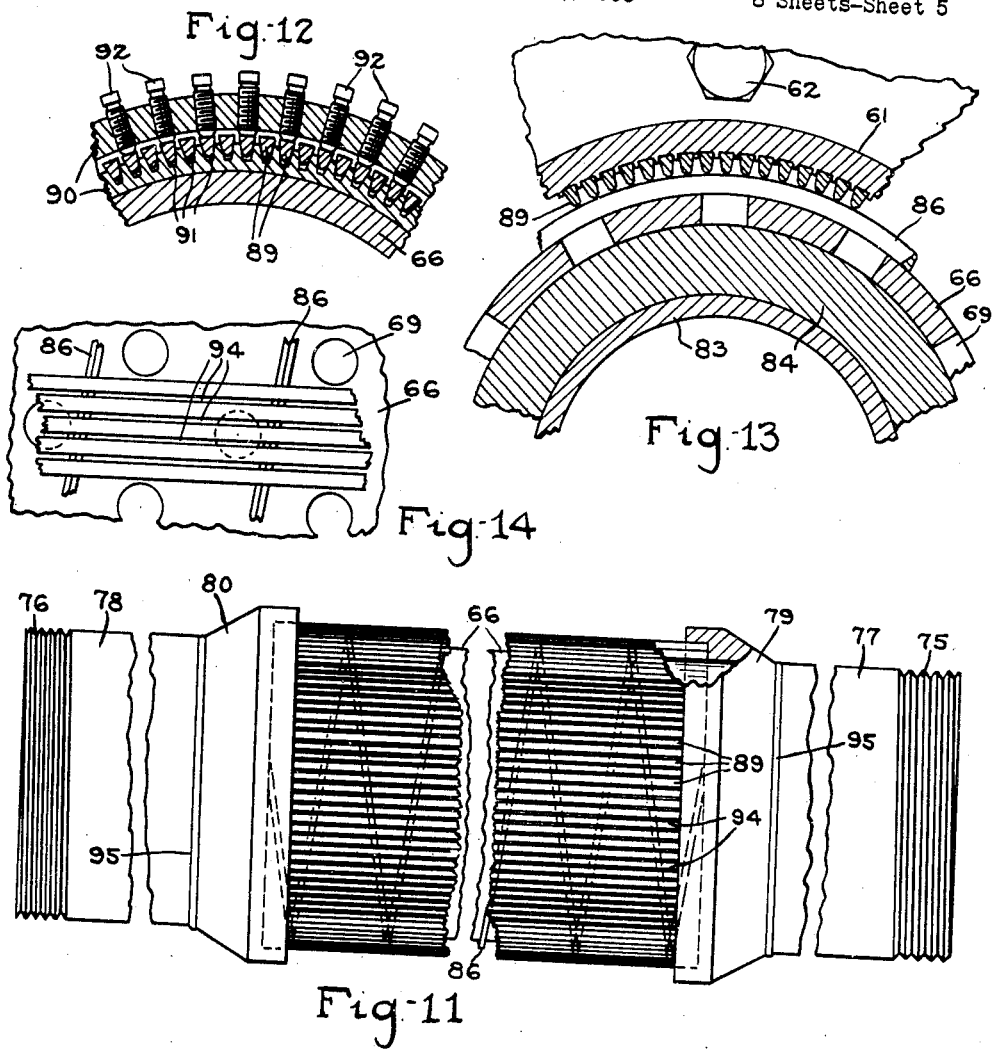

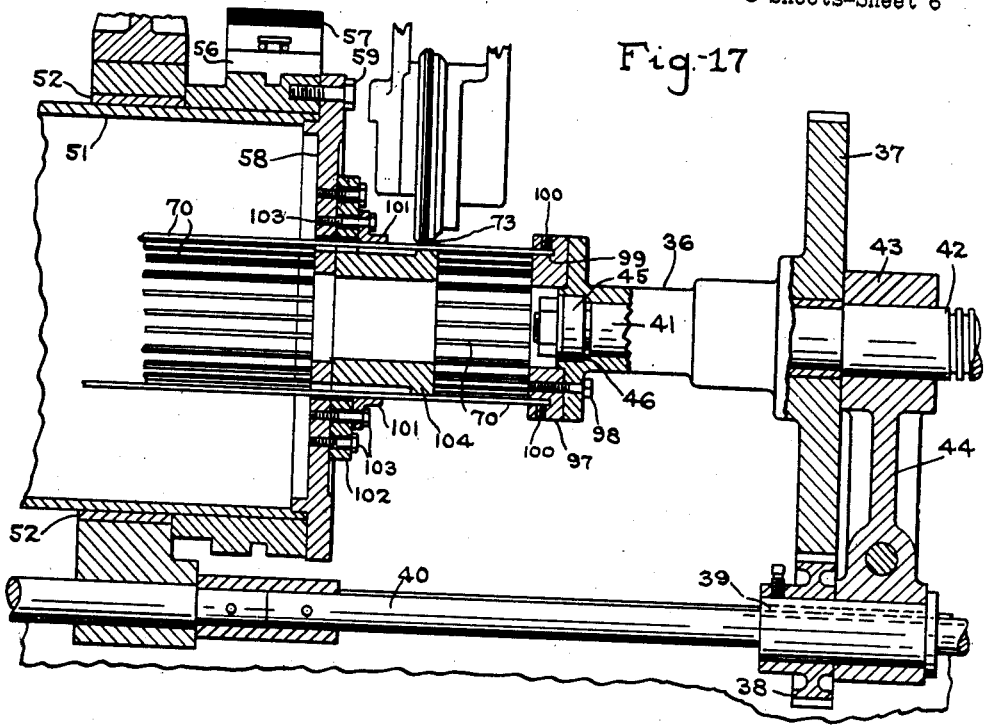
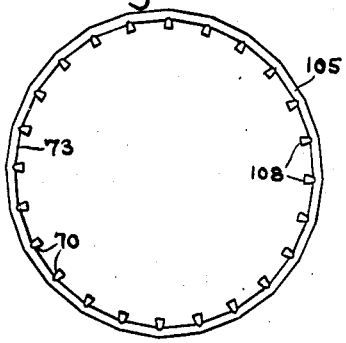
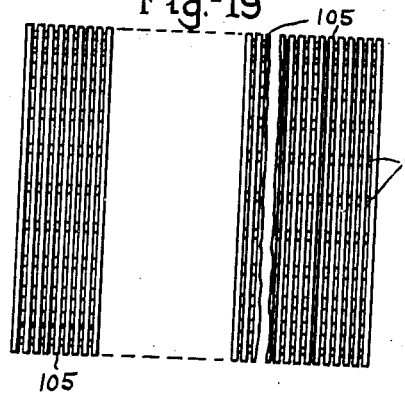
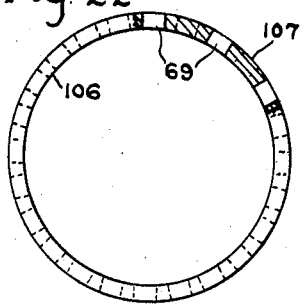
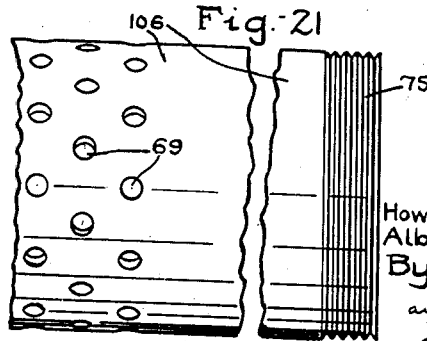

Aug. 24, 1943.   H. O. WILLIAMS ET AL   2,327,686
METHOD OF MAKING DEEP WELL SCREENS
Filed Aug. 1, 1938   8 Sheets-Sheet 7
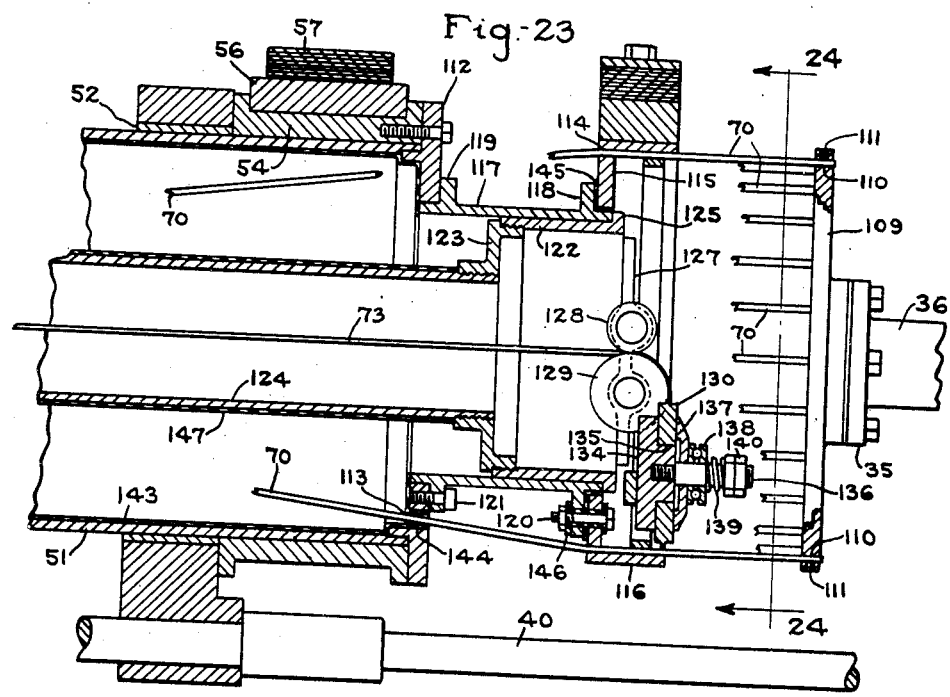
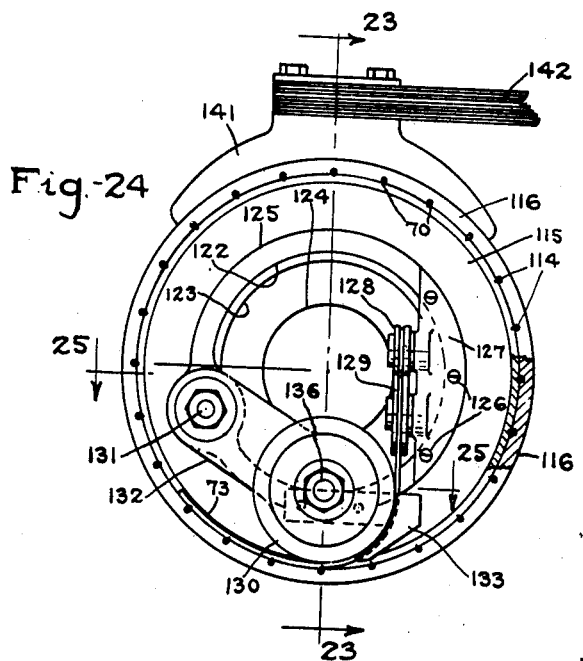
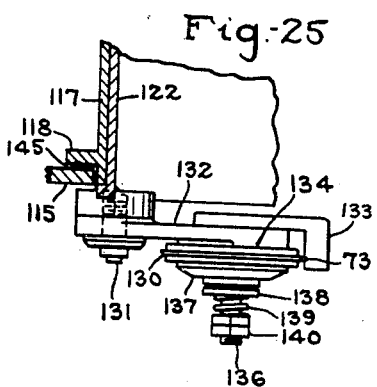
Inventors:
Howard O. Williams
Albert A. Jens.
By Whiteley and Ruckman
Attorneys.

Aug. 24, 1943.  H. O. WILLIAMS ET AL  2,327,686
METHOD OF MAKING DEEP WELL SCREENS
Filed Aug. 1, 1938   8 Sheets-Sheet 8
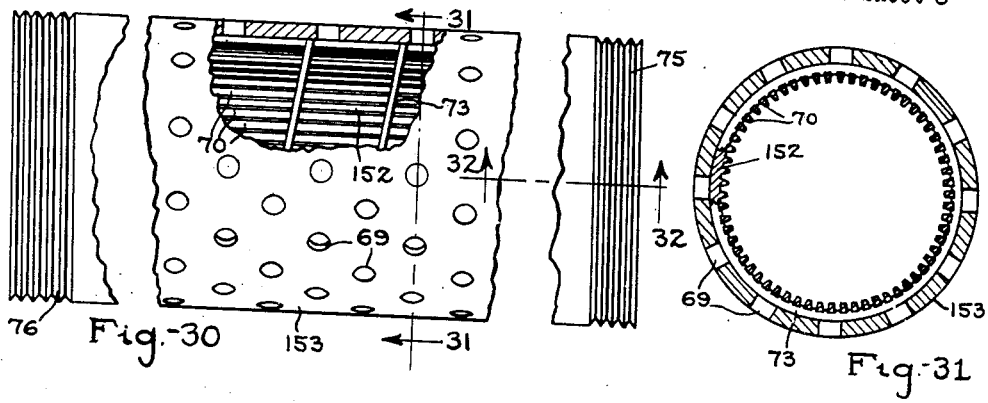
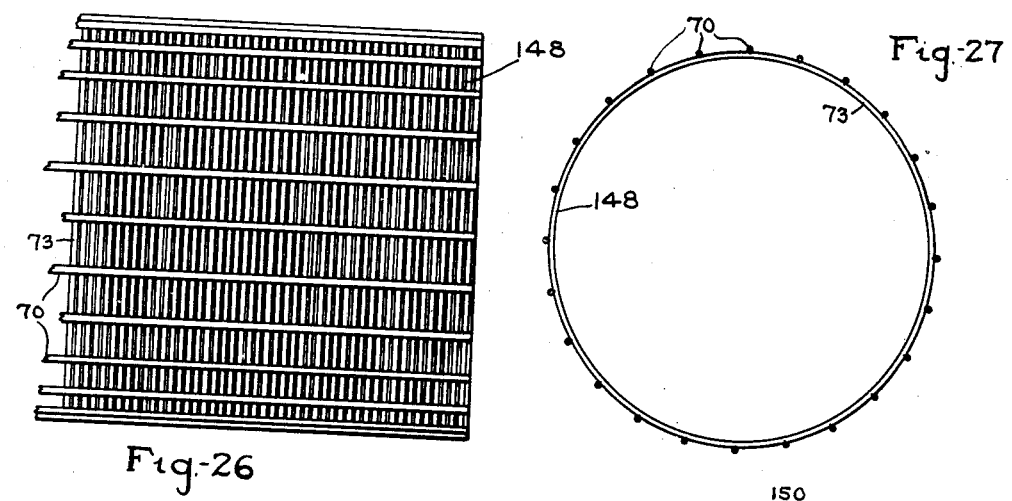
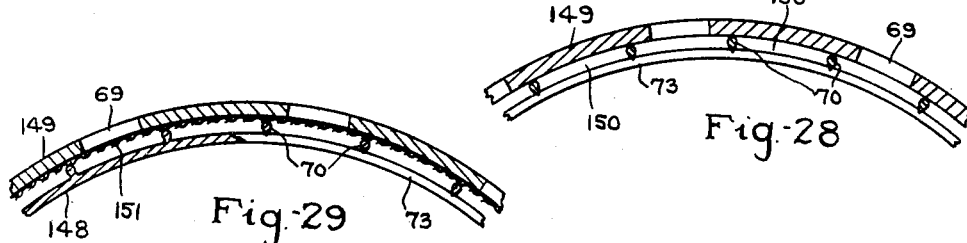
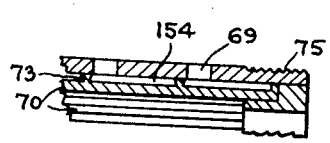
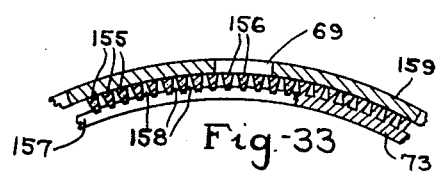
Inventors
Howard O. Williams
Albert A. Jens
By Whiteley and Ruckman
Attorneys.

Patented Aug. 24, 1943

2,327,686

UNITED STATES PATENT OFFICE 2,327,686

METHOD OF MAKING DEEP WELL SCREENS

Howard O. Williams, Minneapolis, and Albert A. Jens, St. Paul, Minn., assignors to Edward E. Johnson, Incorporated, St. Paul, Minn.

Application August 1, 1938, Serial No. 222,410

1 Claim. (Cl. 29—163.5)

Our invention relates to improvements in the method of making deep well screens. It has for its object to provide a method of making a well screen of unusual strength and efficiency which shall embody as part of the screen a prefabricated apertured pipe together with screening means which will be secured and fixed to the pipe by relative meeting and shrinking of elements of the pipe and of the screen so as to hold the pipe and screen rigidly united in the manner of an integral member.

It is a further object of our invention to produce a well screen with a perforated pipe base, a series of metallic elements contacting said base and a covering of wire wound upon said elements and progressively welded thereto in such manner that the expansion of the wire produced by the heat of the welding action shall be progressively followed by contraction of the wire drawing the longitudinal elements upon and into the outer wall of the pipe with force of such magnitude as to hold said elements and the screen surface welded thereto immovably united with the pipe and in effect made integral therewith.

It is a further object of our invention to provide a method of making a well screen having a perforated pipe base with a supporting wire helically laid upon said pipe base and progressively heated by desired means as it is laid so that when said helical wire shall contract it will grip the pipe base so as to be immovably connected therewith and in effect made integral therewith in combination with longitudinal screening elements welded to the said helical wire at each crossing point thereof and being spaced apart to form longitudinal drainage slots, and forming as an entirety an outer screening envelope comprising a multiplicity of longitudinal screening slots held integral upon said pipe base.

It is a further object of our invention to produce a well screen consisting of a screening member formed of longitudinal members spaced apart to provide longitudinal screening slots with a spiral supporting member on the outside of said longitudinal members and welded to each thereof at each crossing point and a perforated pipe base slipped over said outer spiral member when the pipe base has a much higher temperature than the screen so that the base will be shrunk upon the spiral element of the pipe base to be immovably connected therewith and made substantially integral therewith.

A further object of our invention is to produce a well screen in which a multiplicity of spaced longitudinal supporting ribs are provided and a helical wire is laid within said ribs and welded thereto at each crossing point thereof to form a continuous helical drainage slot or a succession of adjacent helical drainage slots in combination with a perforated pipe base slid over the longitudinal supports of said screen member when said pipe base is at a very much higher temperature than the screen member, so that it will be shrunk upon the longitudinal ribs of the screen member so they will be held immovably upon the outer pipe base, and the inner screen member and the outer pipe base will be made into substantially an integral member.

It is a further object of our invention to produce a well screen wherein either of the two inner forms above recited shall have placed about the spaced supporting elements, through the helical rib element or the longitudinal rib elements, a cylinder of woven gauze of suitable mesh in combination with an outer perforated pipe base slipped over said mesh cylinder when the pipe base is of very greatly higher temperature than the screen and cylinder, so that it will be shrunk upon the supporting elements of the screen member through said cylinder of gauze to hold the supporting members and said cylinder of guaze immovably connected, and make them in effect an integral screening member.

It is a further object of our invention to produce a well screen by means of practicing the process or method which consists in fabricating a screening member wherein the parts are integrally welded together and formed with supporting elements, fabricating a perforated pipe base, effecting relative meeting of pipe base and screen to produce a wide difference of relative temperatures whereby the supporting elements of the fabricated screen may be placed in contact with a surface of the perforated pipe base while said elements and the pipe base are at said relatively differing temperatures, and permitting the temperatures thereafter to equalize to room temperature, whereby the said supporting elements and the surface of the pipe base will become immovably connected and the resulting screen structure be made into in effect an integral member.

The full objects and advantages of our invention will appear in connection with the detailed description thereof, and the features of novelty of our invention will be particularly pointed out in the appended claim.

Figure 10:
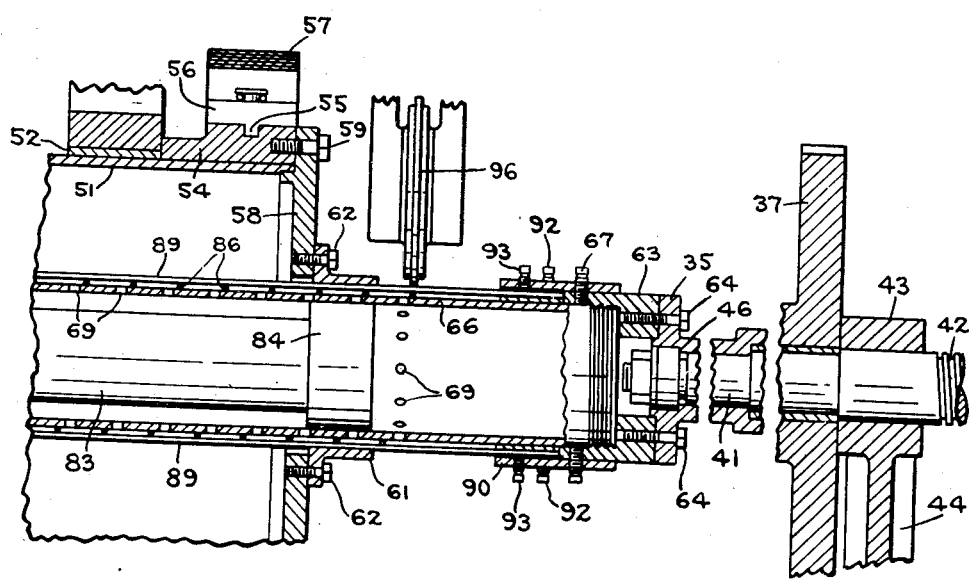

In the drawings, illustrating an application of our invention in some of its preferred forms, Fig. 1 is a sectional end elevation view of apparatus for forwarding together a perforated pipe base and a series of longitudinal rods held thereon together with means for feeding and welding a helical wire on said rods of a type disclosed in Johnson Patent No. 2,046,561. Fig. 2 is an enlarged sectional detail view of what would appear on the section of line 2—2 of Fig. 1. Fig. 3 is a partial sectional view across the pipe base in substantially the plane of the welding disc showing the manner of leading in the wrapping wire over the shaped rods held on the pipe base. Fig. 4 is a side elevation view with some parts broken away of a well screen formed in the manner illustrated in Figs. 1 to 3. Fig. 5 is a sectional view taken on line 5—5 of Fig. 4. Fig. 6 is a longitudinal sectional view taken on line 6—6 of Fig. 4. Fig. 7 is a partial sectional view taken on line 7—7 of Fig. 6. Fig. 8 is a perspective view showing shape and characteristics of one of the longitudinal rods adapted to be positioned upon an inner perforated pipe base. Fig. 9 is a part sectional view similar to Fig. 1 showing the manner of shrinking a helical wire directly upon a perforated pipe base to hold said wire immovably joined thereto. Fig. 10 is a longitudinal sectional view of a pipe base having a helical wire united therewith showing the manner of welding to said helical wire a plurality of spaced longitudinal strainer wires at every point of crossing of the helical supporting wire and the longitudinal strainer wires. Fig. 11 is a side elevation view of a screen made in accordance with the disclosure of Figs. 9 and 10 with some parts broken away. Fig. 12 shows the manner of securing the longitudinal strainer wires upon the head. Fig. 13 is a transverse sectional view showing the manner of holding and guiding the longitudinal wires over the helical wire secured to the perforated pipe base. Fig. 14 is an enlarged fragmentary plan view showing the manner of uniting the longitudinal wires with the helical wire. Fig. 15 is a sectional view through a portion of perforated pipe base, helical wire and longitudinal wires showing the manner of uniting the longitudinal strainer wires with the helical wire upon the pipe base. Fig. 16 is a longitudinal section partly through one of the longitudinal strainer wires showing their manner of union with a helical wire upon the pipe base. Fig. 17 is a longitudinal view similar to the view of Fig. 1 for forming a well screen upon supporting longitudinal wires or rods as in the aforesaid Johnson Patent No. 2,046,461. Fig. 18 shows the manner of union between the supporting rods and wires. Fig. 19 is a side elevation view of a portion of a well screen made in the manner called for in Figs. 17 and 18. Fig. 20 is an end view of the well screen shown in Fig. 19. Fig. 21 is a side elevation of a pipe base cylinder of an external diameter slightly greater than the diameter of the cylinder outlined by the inner margins of the rods in the screen of Fig. 19, as shown in Fig. 20. Fig. 22 shows an end view of the perforated pipe base shown in Fig. 21. Fig. 23 is a longitudinal section taken on line 23—23 of Fig. 24 showing a means of welding a helical wire to the inside of longitudinal rods held to outline a cylinder. Fig. 24 is an end elevation view taken on line 24—24 of Fig. 23. Fig. 25 is a fragmentary sectional view taken on line 25—25 of Fig. 24. Fig. 26 is a longitudinal view of a part of a well screen formed with the helical turns of the screening wire welded to the longitudinal rods to form a cylinder within the cylinder outlined by the inner margins of said longitudinal rods. Fig. 27 is an end view of what is shown in Fig. 26. Fig. 28 is an enlarged transverse sectional detail view of the structure shown in Fig. 26 united to a perforated pipe base by having said pipe base heated to a relatively high temperature and passed over the ribs on the outside of the screen member and thereby shrunk thereon. Fig. 29 is a view similar to Fig. 28 wherein a screening cylinder of metal gauze of a desired mesh is held between the inner wall of the pipe base and the supporting ribs or longitudinal wires of the screen member. Fig. 30 shows the union of an outer perforated pipe base and an inner screen member formed of a helical wire with widely spaced coils to which is welded a multiplicity of longitudinal rods or wires spaced to form screen slots, the outer pipe base being heated to a relatively much higher temperature than the screen member and slipped over the supporting helical coils and shrunk upon them to hold the pipe base and coils immovably united. Fig. 31 is a transverse section taken on line 31—31 of Fig. 30. Fig. 32 is an enlarged sectional detail taken substantially on line 32—32 of Fig. 30. Fig. 33 is a transverse sectional detail of a screen of the type of that shown in Fig. 26 wherein the coils of the helical wire are widely spaced and are welded inside of the cylinder formed by a series of longitudinal wires spaced apart to provide drainage slots with a perforated pipe base passed directly over the screening longitudinal elements when heated to a relatively much higher temperature than the screening member and caused thereby to be shrunk thereon.

As illustrated in Fig. 1, a head 35 has a hub extension 36 upon which is mounted a gear 37 meshing with a pinion 38 slidably splined at 39 upon a drive shaft 40. Through the hub 36 extends a shaft 41 forming an extension of a lead screw 42 which is journaled within a bearing 43 on a support 44. The lead screw extension 41 is provided with an expanded member 45 which engages an annular shoulder 46 formed within head 35 by the inner end of hub 36. The shaft 40 is journaled in hangers 47 and 48 and carries a pinion 49 meshing with a ring gear 50 fast on a rotatable hollow cylindrical driving member 51 which is journaled to rotate in circular bearings 52 and 53 supported by members 47 and 48. The rotatable cylindrical member 51 has a contact ring 54 formed with an annular groove 55, and an electrical shoe 56 engages said ring and groove and receives current through a multiple sheet conductor 57. A head 58 is secured to the contact ring 56 by means of bolts 59. The head 58 is provided with a circular central aperture 60 and an annular guide drum 61 is secured to the head 58 by means of bolts 62 around the circular opening 60, the head 58 and the guide drum 61 being removably secured so as to be readily exchangeable for heads and drums of different sizes to accommodate for the making of screens of different diameters.

The shaft 40 and the lead screw 42 are rotated in a synchronized manner by means not shown, such as are disclosed in Johnson Patents Nos. 2,046,460 and 2,046,461 whereby, in the manner disclosed in detail in said patents, the head 35 is simultaneously rotated and advanced longitudinally in a synchronized manner.

A connector drum 63 is secured by bolts 64 to the head 35, being made thus removable and readily interchangeable for different sizes of screens. The connector drum 63 is formed with an internally-threaded part 65 into which is threaded a pipe member 66 held rigidly connected to the member 63 by means of set screws 67. The pipe member 66 will in practice be a perforated pipe base such as is shown in detail in Figs. 2, 4 and 5.

As shown in enlarged detail in Fig. 2, the guide drum 61 is adapted to encircle in close relation the pipe member 66 and is formed with a multiplicity of shaped guide grooves 68. In practice the grooves 68 will be roughly keystone shaped and will be so positioned in reference to rows of apertures 69 in the perforated pipe base 66 that when the pipe base is held properly positioned on the head 63 the guide grooves or channels 68 will not overlie any of the rows of apertures. The guide grooves 68 also are in practice keystone shaped with side walls approaching each other downwardly from the center of the pipe member 66. Within the guide grooves or channels 68 are held a series of longitudinal wires or rods 70, preferably of the same keystone shape as the guide channels 68. These bars 70 are extended through the apertures 68 with the bottom faces 71 contacting the outer surface of pipe base tube 66, as clearly shown in Figs. 2 and 3. The ends of wires 70 are extended beyond the end of guide drum 61 to a point below a welding disc 72 on a carrier 72a supported by an arm 72b, all as clearly disclosed in the aforesaid Johnson Patents Nos. 2,046,460 and 2,046,461. The longitudinal wires 70 will preferably have the cross sectional shape clearly indicated in Figs. 7 and 8 with a V-shaped top which comes to a substantial edge. Upon these longitudinal wires and underneath the welding disc 72 is laid a transverse wire 73 having much the same cross-sectional shape as the longitudinal wires 70, as clearly shown in Fig. 6. The wire 73 passes through a guide 74 and is adapted to be fed, positioned and tensioned by the means described in detail in the aforesaid Johnson patents. The wire 73 as shown in Fig. 3 will be fed slowly as the head 35 and attached pipe base 66 are rotated and advanced longitudinally, the wire being guided and passed under the welding disc 72 to successively weld the said wire to the spaced longitudinal wires or rods 70. After one helical coil has been laid so that the helical wire welded to the longitudinal wires holds them in fixed position the machine is started and the welding carried on as disclosed in Johnson Patent No. 2,046,641. As the pipe base 66 and rods 70 thereon are rotated and advanced longitudinally, successive coils of the helical wire 73 will be laid upon the rods 70 and welded thereto at each crossing point of the helically-wound wire and the longitudinal wires. This results in a constant heating of the wire and expansion which is progressively forwarded ahead of the welding disc 72. That is, the wire of the helical coils is constantly elongated and yet laid tight upon the wires 70 as it is welded thereto, so that as the coils cool they will progressively contract, drawing the longitudinal wires 70 and the base 71 thereof very firmly upon the outer surface of the perforated pipe base 66. Tests have shown that this contraction is of such force as actually to distort relatively the metal of the pipe base surface and of the bases 71 of the longitudinal wires. This results in so firmly contacting the bases 71 of the longitudinal wires 70 with the outer surface of pipe base 66 as to hold said wires immovably connected with the surface of the pipe base and in effect to cause the pipe base and the longitudinal wires to become an integral and unitary structure. The completed resulting screen is shown in Figs. 4 and 5, wherein the threaded ends 75 and 76 of non-perforated portions 77 and 78 of pipe base 66 form means of union with any pipe-line connection with the screen. Guards 79, 80 are applied over the ends of the wrapper formed of helical coils indicated generally by the reference numeral 81 which protect and close the helical coils and the ends of the longitudinal rods, as clearly shown in Figs. 4 and 6. Also, as shown in Fig. 6, the rods 70 immovably secured upon the outer surface of pipe base 66 provide a series of longitudinal valleys 82 which communicate with rows of holes 69 through the pipe base for conveying liquid that has passed the strainer surface of the wrapper 81 to the interior of the pipe base 66.

The resulting structure combines the advantages of a screen formed of longitudinal rods and a helical wire wrapped therein and welded to the rods at every crossing point thereof with the strength and sturdiness of a pipe base support, being far stronger than the sum of the strengths of the screen member and of the pipe base taken individually, since the screen wrapper 81 is integrated with the rods 70 and the shrinking of the progressively-heated wrapper wire 73 upon the rods 70 and through them upon the surface of pipe base 66 produces in effect an integral structure combining and multiplying the strengths of each of the two units which form it.

It will be noted that the pipe base 66 is of extended length so as to be subject to gravity distortion unless suitably supported during operation upon it. To give such support we provide a heavy pipe 83 of smaller diameter than pipe base 66 which extends along the center of said pipe base, as clearly shown in Figs. 1, 2, 9 and 10. The heavy pipe 83 is surrounded by washers 84 spaced at suitable intervals and rather snugly fitting the interior of pipe 66, as clearly shown in Fig. 1, the washers preferably being held to the heavy pipe 83 by set screws 85. The heavy pipe 83 is thus caused to move with pipe base 66 and support the same against transverse distortion under the welding wheel 72 as the pipe base 66 and the longitudinal rods 70 thereon are simultaneously rotated and advanced longitudinally.

In the form of the invention shown in Fig. 9, the parts for supporting the pipe base and giving it a simultaneous rotating and longitudinal advance, are identical with the parts shown in Figs. 1 to 8 inclusive. In the latter construction, however, a spiral wire 86, similar in all respects to spiral wire 73, is wound directly upon pipe base 66, which is advanced at such speed relative to the rate of rotation as to produce wide spacing of the helical coils, as indicated at 87 in Fig. 9. The wire 87 while is is being wound may be subjected to electrical current for progressively heating it and causing it to shrink upon pipe base 66. But we have found the use of an oxy-acetylene torch, indicated at 88 in Fig. 9, to be highly efficient for the purpose and to require less expense of operation. In this manner, as clearly indicated in Fig. 9, while the pipe base is rotated and advanced longitudinally the wire laid upon it will be heated progressively to a very much greater degree than the sides of the pipe base will be heated. Thereafter, the wire, which has been greatly extended by this heating as it it laid, will contract, bringing the bases 71 of the helical coils of the wire upon the outer surface of pipe base 66 with a degree of force, which experiments have shown will distort the metal of both the pipe base and the helical coils and connect the helical coils with the pipe base so firmly as to make them substantially integral.

After the wire 86 in spaced coils, as indicated in Fig. 9, has so been attached to pipe base 66, a series of longitudinal rods 89, in all respects identical with longitudinal rods 70, are carried through the guide member 61 over the tops of the helical coils of wire 86. The pipe base 66 is secured to the head 35 in exactly the same way as it is in the part of the invention shown in Fig. 1. Rods 89 are, however, passed into apertures in a sleeve member 90 formed with guide sockets 91, as shown in detail in Fig. 12. Staggered sets of set screws 92 and 93 (see Fig. 10) force the wires 89 firmly into the socket portions 91 and hold them rigidly connected to sleeve member 90 and through threaded connector 63 and bolt 64 to rotating and advancing head 35. The longitudinal rods 89, as clearly shown in Figs. 12 and 13, positioned upon the helical coils of wire 86, are spaced so close together as to leave suitable drainage slots 94 between pairs of said rods.

As shown in Fig. 11, the ends 77 and 78 of pipe base 66 are threaded at 75 and 76 as in the form shown in Fig. 4. Also similar guards 79 and 80 are applied to the ends 77 and 78 of pipe base 66 and are secured thereto by means of a preferably welded ring 95, as shown in section in Fig. 6.

The screens of Fig. 4 and of Fig. 11, therefore, are similar in that each is provided with a helical wire caused to be shrunk upon the pipe base 66 by progressively meeting said wire as it is wound, whereby it is continually lengthened and the subsequent shrinking causes it to bind tightly upon the pipe base. In the form of Fig. 4 this binding is effected through longitudinal supporting rods 70 held against the outer surface of pipe base 66, and the helical wire forms successive rings of the helical slot for drainage openings. In the form of Fig. 11 the helical wire is shrunk directly upon pipe base 66 by being heated and lengthened as laid thereon and the longitudinal rods are subsequently welded to the spaced coils of the helical wire shrunk on the pipe base so that the spaces between adjacent pairs of rods form the drainage slots.

The manner of holding and guiding the longitudinal rods 89 over the spaced coils of helically laid wire 86 has already been described. The means of effecting the welding is shown in Fig. 10. A welding wheel 96, in all respects similar to welding wheel 72, heretofore described, rides on the outer surface of rods 86. The means for rotating and moving longitudinally the guided rods 89 and pipe base 66 are similar to the means heretofore described except that the rate of longitudinal movement in relation to the rotating movement will be such as to keep wheel 96 at all times above the spaced helical coils of wire 86. In this manner current is successively passed through the longitudinal rods 89 and into wire 86, whereby said rods of wire are sunk together uniform distances and welded together at every crossing point, thus producing the well screen shown in detail in Fig. 14.

As shown in Figs. 17, 18 and 19 a well screen can be fabricated, as in said Johnson Patent No. 2,046,461, entirely independent of any pipe base. The arrangement for rotating and forwarding longitudinally the rods 70 and for laying a welding on the wire 73 is the same as shown in Fig. 17 as in Fig. 1. In Fig. 17 a connector member 97 is secured to head 35 by bolts 98. Member 97 is provided with sockets 99 into which extend the ends of rods 70 which are secured thereto by set screws 100. The rods 70 are held positioned and guided by members 101 and 102 held to the head 58 by means of bolts 103. The wire 73 is fed in exactly the manner indicated in Fig. 3 above the rotating and advancing longitudinal rods 70 as they pass over an anvil 104, where the wire is welded successively to each longitudinal rod at every crossing point. In this welding the wire and rods are sunk together and welded as clearly indicated in Fig. 18.

The result is a screen 105 formed with helical coils of drainage slot secured to longitudinal rods but having no supporting pipe base, as shown in Figs. 19 and 20. A pipe base 106, Fig. 21, is provided having an outer diameter 107 at room temperature somewhat greater than the inner diameter 108 of the screens outlined by the inner surfaces of rods 70, the relative diameters of the inside of screen 105 and the outside of pipe base 106 being shown comparatively in Figs. 20 and 22. When, however, the screen 105 is given a temperature relatively very much greater than the pipe base 106, as by heating screen 105 or by cooling very greatly as with dry ice or liquid air pipe base 106, the relative relation between inner diameter of screen 105 and outer diameter of pipe base 106 will be such that the pipe base, while this difference in temperature exists, may be slipped within the screen contacting the bases of the longitudinal rods 70. And when the temperatures of the two members 105 and 106 come back to air temperature (by cooling of the heated member or warming of the cooling member, or by both), the two members will be shrunk together to cause the outer surface of pipe base 106 to engage the inner faces of rods 70 with such force as to unite the two members and hold them together immovably and substantially make them integral, thus producing in a slightly different way the identical well screen of Fig. 4.

It may be desirable in some instances to attach the spiral wire to the longitudinal rods inside of the cylinder outlined by the inner edges of said rods and thereafter assemble the resulting screen within the pipe base and shrink the pipe base upon the screen in the manner heretofore described. Means for accomplishing the welding of the helical wire on the inside of the rods is shown in Figs. 23, 24 and 25. In this construction a rod-holding plate 109, similar to the holding plate 97 of Fig. 17, is secured to the head 35, which through connections as shown in detail in Fig. 1, rotates and advances the plate 109. The plate 109 is provided with a multiplicity of holes 110 through which the rods 70 are extended and are secured in said holes by means of set screws 111, all as clearly shown in Fig. 23. The rods are led through drum 51 to a header plate 112, similar to plate 58 of Fig. 1, and thence through apertures 113 in said header 112 through apertures 114 in a flange 115 and along the inside surface of an anvil drum 116 integrally connected with the flange 115. The member 115, 116 is carried by a drum 117 formed with annular flanges 118, 119, being bolted as indicated at 120 to the flange 118 of drum 117. The flange 119 of drum 117 is bolted to the header 112 at 121 so that members 109, 115, 117 and 112, with the rods held positioned and guided thereby, are caused to rotate with the drum 51. The drum 117 is adapted to rotate upon an inner drum 122 which forms in effect a bearing for drum 117 and which is secured to a flange head 123 on a pipe 124 supported within the drum 51 and held from turning therewith. The drum 122 is provided with a flange member 125 and upon the flange 125 is secured by means of screws 126 a bracket member 127 which carries tension and guide rollers 128 and 129.

The wire 73 to be spirally wound passes through the tube 124 and to and between guide rollers 128 and 129, from where it is laid over welding disc 130 as shown in Figs. 23 and 24. Pivoted at 131 to the flange 125 is an arm 132 which carries an arcuate guide 133 between which and the welding disc 130 the wire 73 is fed, as shown in Figs. 24 and 25. Upon arm 132 is secured a bearing block 134 and the welding disc 130 is held on the bearing boss 135 of bearing block 134 by means of a bolt 136 threaded into boss 134 and a washer 137 engaging the welding disc 30, as shown in Fig. 23, which washer surrounds the bolt 136 and is held in yielding engagement therewith by a follower 138 and a compression spring 139 between the follower and a nut 140 surrounding the bolt 136. The parts above described mounted on arm 132 and pivoted to swing downwardly under the impetus of gravity about pivot 31 are relatively heavy and hold the wire 73 firmly in engagement with margins of the rods 70 above the anvil ring 116.

Current passes to the welding ring 130 from the conductor plates 57 and shoe 56 through conductor ring 54, cylinder 117, cylinder 122, with its flanges 125 and arm 132, and goes through wire 73 and longitudinal rods 70 to contact ring 116, shoe 141 and leaf spring conductor 142. Insulation indicated in heavy lines at 143 on the inside of cylinder 51, at 144 about the holes 113 through which longitudinal rods 70 pass, at 145 between flange 115 and parts of drum members 117, and at 146 about bolt members 120, constrain the current from conductor 57 to flow to the welding disc 130 and from there through contact of wire 73 with longitudinal rods 70 to the anvil ring 116, shoe 141 and conductor 142. The tube 124 is also insulated, as indicated at 147, to insure that rods 70 shall not make a circuit by contact with the outer wall of tube 124 as well as by contact with the inner wall of tube 51.

The resulting screen 148 is shown in Figs. 26 and 27, wherein, as clearly shown, the rods 70 are on the outside of the helically-wound wire. With this construction a pipe base 149, Fig. 28, is provided with an inside (air temperature) diameter somewhat less than the diameter of the cylinder outlined by the outer edges of rods 70. Hence, when the relative temperatures of the pipe base 149 and the well screen 148 are made widely different, as by heating the pipe base or by cooling the screen 148, or both, the pipe base may be slipped over the rods 70 upon the outside of screen 148, and when cooled to air temperature the pipe base 149 will have shrunk upon the rods 70 so as to hold the pipe base immovably connected together so as to be substantially integral, wherein the screen is on the inside of the pipe base and the pipe base thus forms a powerful protecting member about the well screen. In this form of our invention channels 150 are formed between adjacent pairs of rods 70, as clearly shown in Fig. 28.

As shown in Fig. 29, a lining cylinder 151 of copper mesh or other metal mesh may be slipped over the outer edges of rods 70 before the well screen 148 has applied to it the pipe base 149. When the parts are shrunk together thereafter, the wire mesh member 151 will be held firmly between rods 70 and pipe base 149 so as everywhere to overlie the openings 69 through the pipe base to the interior thereof. This arrangement may have many advantageous uses.

As shown in Fig. 30, a screen may be fabricated wherein the spaced spiral wire will be on the outside of longitudinal rods arranged to form drainage slots between the same, such a screen being indicated by the numeral 152. In making the assemblage of this screen a pipe base 153 is provided having an inner diameter slightly less than the diameter of the cylinder outlined by the outer margins of the spiral wire 73, which is widely spaced upon longitudinal rods 70, and outside of said rods.

In assembling this construction the temperatures of pipe base 153 and screen member 152 will be made widely different in the manner hereinbefore referred to, as by heating pipe base 153, cooling screen member 152, or both, so that when the two members shall have assembled as indicated in Fig. 30 and their temperatures have come to room temperature, the pipe base 153 will be shrunk upon the helical coils of wire 73 so as to cause said coils to be immovably pressed upon and through the inner surface of pipe base 153 to render the structure a substantially integral one.

As clearly shown in Figs. 30 and 32, channels 154, which are relatively wide and helical in form, are provided between coils of the spaced wires 73.

Employing the apparatus shown in Figs. 23, 24 and 25, a well screen may be fabricated wherein a series of longitudinal rods 155, formed with flat tops as indicated at 156, having a widely spaced spiral wire 73 welded to the inside of the cylinder of rods 155, as shown in Fig. 33. The resulting well screen 157, as clearly indicated, provides an outer screen surface with longitudinal slots 158 through which liquid can strain. A pipe base 159 is provided having an internal diameter slightly less than the diameter of the cylinder outlined by the outer faces of rods 155. The pipe base 159 will be given a temperature widely different from that of the screen 157, so that it may be slipped over said screen and when the members come to room temperature the longitudinal rods of the well screen will be immovably connected with the inner surface of the pipe base so as to make them substantially integral. This form of our invention provides an unusually strong form of the invention well adapted to resist the terrific pressures encountered in very deep wells, particularly oil wells.

The manner of practicing our invention, and its advantages, have been very fully pointed out in connection with the detailed description thereof heretofore given. A fundamental feature of our invention in all of its form above outlined is the combination of a metallic screen, wherein the supporting and screening elements are integrally united by being welded together at each crossing point, with a perforated pipe base of standard construction, the screen and the pipe base being immovably united together and made substantially integral by causing elements of the screen to be shrunk upon or within the pipe base in such manner as to effect an immovable union between the same. This results in a well screen of tremendous strength. It does not, of course, have the capacity of the well screen formed with longitudinal and helically-wound elements by itself, since the pipe base is provided with a necessarily limited amount of drainage openings. But the screen is designed to be used in very deep wells where liquid pressures, either oil or water, are so great that the area of screening surfaces is not so important as capacity to resist these very heavy pressures. Each of the above-indicated forms of well screen does have this great capacity to resist pressures, and has it with the most efficient use considering weight of the metal going into the well screen.

We claim:

A method of making well screens embodying an inner prefabricated perforated pipe base and an outer screening surface formed with inner longitudinal supporting elements caused to engage and be immovably held upon the outer surface of the pipe base so as to form longitudinal channels running along the outer surface of the pipe base into which the perforations therethrough enter, which consists in forming an integrally united screen member comprising spaced longitudinal supporting elements and circumferential elements all welded together to form an integral cellular structure having a series of longitudinally extended spaces of predetermined width between all pairs of longitudinal elements and a continuous series of helical inwardly expanded slots, providing a pipe base having at normal temperatures an outer diameter greater than the inner diameter of the cylinder outlined by the inner margins of said longitudinal elements, forming in said pipe base longitudinal rows of openings through the walls thereof staggered in alternate rows with portions of the pipe base between each pair of rows unperforated and said unperforated portions being spaced apart distances corresponding to the spaces between said longitudinal elements, causing the integral screen member to be brought to a relatively much higher temperature than the pipe base so that the longitudinal elements of the screening member may be slipped over the outer surface of the pipe base, positioning the screening member when at said higher relative temperature so the longitudinal elements integral therewith are placed along the several unperforated portions of the pipe base between rows of perforations therethrough, and thereafter equalizing the temperature of said screen member and pipe base, whereby the longitudinal elements of the screen member are immovably united with the unperforated portitons of said pipe base on the outer surface thereof thus forming a united and substantially integral well screen device having channels beneath the screening surface running along and over the rows of perforations through the pipe base.

HOWARD O. WILLIAMS.
ALBERT A. JENS.